United States Patent [19]

Fujiwara et al.

[11] Patent Number: 4,498,066
[45] Date of Patent: Feb. 5, 1985

[54] ELECTROMAGNETIC DEVICE

[75] Inventors: Takahisa Fujiwara; Masaaki Narihisa, both of Ise; Katsuyuki Tamai, Yokohama, all of Japan

[73] Assignees: Shinko Electric Co., Ltd.; Isuzu Motors Limited, both of Tokyo, Japan

[21] Appl. No.: 525,894

[22] Filed: Aug. 24, 1983

[30] Foreign Application Priority Data

Sep. 10, 1982 [JP] Japan ................. 57-158434

[51] Int. Cl.³ .............................. H01F 7/08
[52] U.S. Cl. ................... 335/281; 188/164; 192/84 C
[58] Field of Search .............. 335/281, 296, 297; 188/161, 164; 192/84 C, 84 T, 84 A

[56] References Cited

U.S. PATENT DOCUMENTS

| 3,263,784 | 8/1966 | Pierce | 192/84 C |
| 4,285,421 | 8/1981 | Halsted | 192/84 C |
| 4,425,520 | 1/1984 | Hiraga | 192/84 C X |

FOREIGN PATENT DOCUMENTS 12127  6/1980  Japan ................. 192/84 C

Primary Examiner—George Harris
Attorney, Agent, or Firm—Oblon, Fisher, Spivak, McClelland & Maier

[57] ABSTRACT

An electromagnetic device includes an electromagnet having one electrical coil and an annular member of high permeability having a pair of radially spaced first and second circumferential magnetic resistance portions. The first and second armatures are disposed in opposed relation to the first and second magnetic resistance portions, respectively. At least one of the first and second magnetic resistance portions is interrupted by circumferentially spaced magnetic bridge portions having such a size as to allow a predetermined amount of magnetic flux to pass therethrough to attract the one of the first and second armatures, disposed in opposed relation to the other of the first and second magnetic resistance portions, into contact with the annular member when excitation current of lower magnitude is applied to the coil. When excitation current of higher magnitude is applied to the coil, the magnetic flux passes through the first and second armatures, thereby attracting them into contact with the annular member.

5 Claims, 9 Drawing Figures

ELECTROMAGNETIC DEVICE

BACKGROUND OF THE INVENTION

1. Field of the Invention

This invention relates to an electromagnetic device, such as an electromagnetic clutch and an electromagnetic brake, in which two armatures are selectively attracted into contact with a friction surface upon energization of an electromagnet having one electric coil.

2. Prior Art

A conventional electromagnetic clutch 10 shown in FIGS. 1 and 2 comprises a rotor 11 mounted through bearing members 12 on a hollow cylindrical portion 13a of an equipment 13 in which the electromagnetic clutch 10 is used, the rotor 11 having a base portion 11a and a pair of concentrically-disposed annular recesses 11b and 11c. The base portion 11a has a friction surface 11d. The rotor 11 has a pulley portion 11e of a generally V-shaped cross-section at its outer periphery. A drive belt (not shown) connected to a drive means (not shown) such as an electric motor is received in the V-shaped pulley portion 11e for rotating the rotor 11. A yoke 15, made of a material of high permeability such as iron, is mounted on the equipment 13 and has a pair of annular hollow portions 15a and 15b disposed concentrically. First and second electric coils 16 and 17 are received in the hollow portions 15a and 15b, respectively. A pair of non-magnetic rings 18 and 19 are embedded in the base portion 11a of the rotor 11 for providing magnetic poles on the base portion 11a when the electromagnet means constituted by the yoke 15 and the coils 16 and 17 are excited. The annular hollow portions 15a and 15b are loosely received in the annular recesses 11b and 11c, respectively, so that the first and second coils 16 and 17 are disposed in opposed relation to the non-magnetic rings 18 and 19, respectively. An output shaft 19 is mounted on the equipment 13 through a bearing member 20. A hub 21 is rotatably mounted on the output shaft 19 through bearing members 22 and carries a leaf spring 23 which in turn supports a first armature 25 through a mounting member 26, the first armature 25 being disposed in closely spaced relation to an outer portion of the friction surface 11d of the rotor base portion 11a. Fixedly mounted to the output shaft 19 is a hub 27 which supports a second armature 28 through a leaf spring 30, the second armature 28 being disposed in closely spaced relation to an inner portion of the friction surface 11d of the rotor base portion 11a.

With this arrangement, when the first coil 16 is excited or energized through an associated excitation circuit (not shown), a magnetic flux is produced in the electromagnetic clutch 10 as indicated by arrows in FIG. 1 to provide a magnetic circuit, so that the first armature 25 is attracted into contact with the friction surface 11d of the base portion 11a of the rotor 11 against the bias of the leaf spring 23 and rotated together with the rotor 11. Therefore, the rotation of the rotor 11 is transmitted via the armature 25, the mounting member 26, the leaf spring 23 and the hub 21 to a first load (not shown) connected to the hub 21. Upon de-energization of the coil 16, the first armature 25 is brought out of contact with the base portion 11a of the rotor 11 under the influence of the leaf spring 23.

On the other hand, when the second coil 17 is excited with the first coil 16 de-energized, a magnetic flux is produced in the electromagnetic clutch 10 as indicated by arrows in FIG.2 to provide a magnetic circuit, so that the second armature 28 is brought into contact with the friction surface 11d of the rotor 11 under the influence of electromagnetic attractive forces and is rotated together with the rotor 11. Therefore, the rotation of the rotor 11 is transmitted via the second armature 28, the leaf spring 30 and the hub 27 to the output shaft 19 which is connected to a second load (not shown).

This conventional electromagnetic clutch 10 has been found disadvantageous, however, in that it is relatively heavy in weight and complicated in construction and hence expensive in manufacture since it employs the two coils. In addition, since the two coils are disposed in radially spaced relation, the electromagnetic clutch 10 is bulky in construction. Further, in order that the first and second loads can be driven at the same time, the magnetic fluxes must be produced by the respective coils in such a direction that the magnetic fluxes will not cancel out each other. Therefore, the associated excitation circuit is rather complicated in construction.

SUMMARY OF THE INVENTION

It is therefore an object of this invention to provide an electromagnetic device such as an electromagnetic clutch and an electromagnetic brake with one electrical coil which is less heavy in weight, compact in size and can be easily manufactured.

According to the present invention, there is provided an electromagnetic device which comprises an electromagnet including an electrical coil; means for selectively applying excitation current to the coil in a higher-magnitude mode and a lower-magnitude mode; first and second spring-loaded armatures; an annular member made of a material of high permeability and having one surface disposed in closely spaced, opposed relation to the coil, the annular member having a pair of radially spaced first and second circumferential magnetic resistance portions, the first and second armatures being disposed in opposed relation to the first and second magnetic resistance portions, respectively, at least one of the first and second magnetic resistance portions being interrupted by circumferentially spaced magnetic bridge portions having such a size as to allow a predetermined amount of magnetic flux to pass therethrough to attract the one of the first and second armatures, disposed in opposed relation to the other of the first and second magnetic resistance portions, into contact with the other surface of the annular member when the excitation current of lower magnitude is applied to the coil, the first and second armatures being spaced so closely from the other surface of the annular member that when the excitation current of higher magnitude is applied to the coil, the magnetic flux passes through the first and second armatures, thereby attracting them into contact with the other surface of the annular member.

DESCRIPTION OF THE PREFERRED EMBODIMENTS OF THE INVENTION

Figure 1:
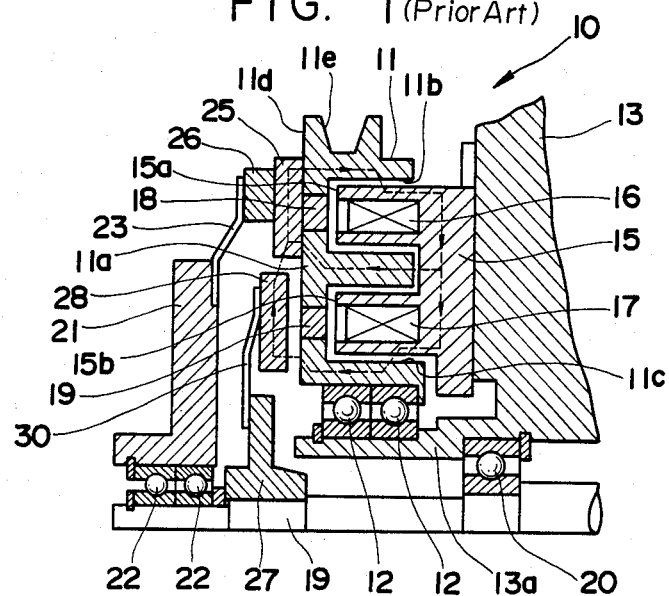
FIGS. 1 and 2 are cross-sectional views of an upper half of an electromagnetic clutch provided in accordance with the prior art.

The invention will now be described with reference to the drawings in which like reference characters denote corresponding parts in several views.

Figure 3:
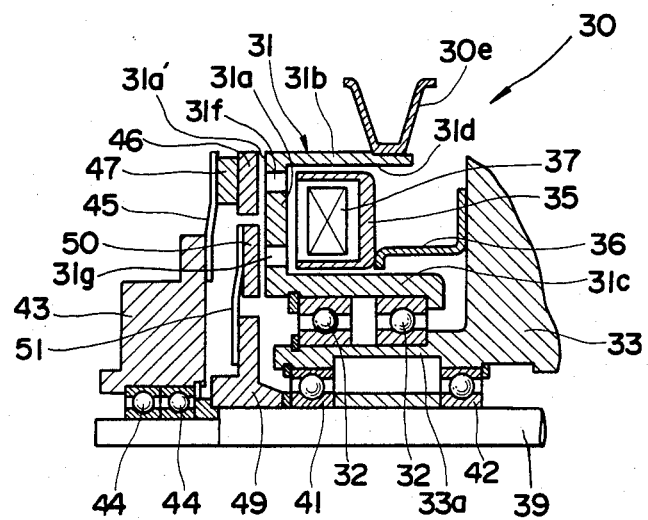
FIG. 3 is a cross-sectional view of an upper half of an electromagnetic clutch provided in accordance with the present invention.

An electromagnetic clutch 30 shown in FIG. 3 comprises a rotor 31 having an annular base portion 31a and a pair of concentric walls 31b and 31c extending from the base portion 31a to provide an annular hollow portion 31d of a generally U-shaped cross-section, the rotor 31 being mounted via a pair of bearing members 32 and 32 on a hollow cylindrical portion 33a of a frame 33 of an equipment in which the electromagnetic clutch 30 is used. The base portion 31a has a friction surface 31a'. The rotor 30 has a pulley portion 30e of a generally V-shaped cross-section at its outer periphery. A drive belt (not shown) connected to a drive means (not shown) such as an electric motor is received in V-shaped pulley portion 31e for rotating the rotor 31.

An annular hollow member 35 of a channel-shaped cross-section made of iron is supported on the frame 33 by a flange 36, and an electric coil or winding 37 is received in the hollow iron member 35 to provide an electromagnet. The hollow iron member 35 is loosely received in the annular hollow portion 31d of the rotor 31 and opens toward the base portion 31.

Figure 4:
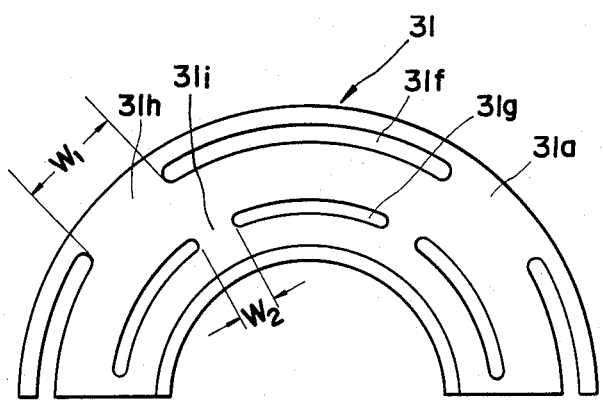
FIG. 4 is an enlarged side-elevational view of an upper half of a base portion of a rotor.

A plurality of first arcuate slots 31f are formed through the base portion 31a of the rotor 31 in circumferentially spaced relation to one another, as best shown in FIG. 4. Also, a plurality of second arcuate slots 31g of a reduced length are formed through the base portion 31 in circumferentially spaced relation to one another, the second arcuate slots 31g being disposed radially inwardly of the first arcuate slots 31f. The first and second arcuate slots 31f and 31g serve as magnetic resistance portions so as to produce magnetic poles in the base portion 31a of the rotor 31 when the electromagnet is energized.

An output shaft 39 to which a first load (not shown) is connected is rotatably mounted on the frame 33 through bearings 41 and 42. A hub 43 to which a second load (not shown) is connected is rotatably mounted on the output shaft 39 through bearings 44 and carries a leaf spring 45 which in turn supports a first armature 46 through a mounting member 47. The first armature 46 is disposed in closely spaced relation to an outer portion of the friction surface 31a' of the rotor base portion 31a. Fixedly mounted on the output shaft 39 is a hub 49 which supports a second armature 50 through a leaf spring 51, the second armature 50 being disposed in closely spaced relation to an inner portion of the friction surface 31a' of the rotor base portion 31.

Portions 31h of the rotor base portion 31a lying between respective adjacent first arcuate slots 31f serve as first magnetic bridge portions. Similarly, portions 31i of the rotor base portion 31a lying between respective adjacent second arcuate slots 31g serve as second magnetic bridge portions. The width $W_1$ of the first bridge portion 31h is greater than the width $W_2$ of the second bridge portion 31i.

Figure 5:
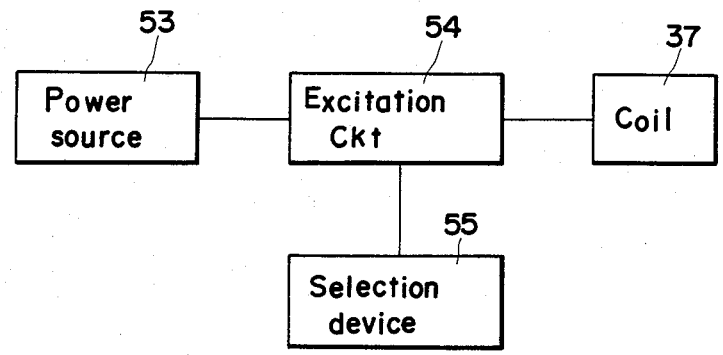
FIG. 5 is a block diagram of a control unit for the electromagnetic clutch of FIG. 3.
Figure 6:
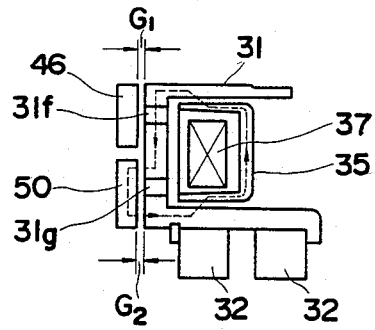
FIGS. 6 through 8 are fragmentary cross-sectional views of the electromagnetic clutch of FIG. 3 showing magnetic fluxes.

The coil 37 is adapted to be supplied with an excitation current of two different magnitudes for being energized or excited, so that the first and second armatures 46 and 50 are electromagnetically attracted into contact with the friction surface 31a' of the rotor base portion 31a either alone or in combination. More specifically, as shown in FIG. 5, a power source 53 supplies the excitation current. The excitation current is varied in magnitude in two modes, that is, a higher magnitude mode and a lower magnitude mode, under the control of an excitation circuit 54. The switching of the excitation current is effected by a selection device 55 such as an electrical switch. When the excitation current of a lower magnitude is applied to the coil 37, a magnetic flux passes the first bridge portions 31h and the second armature 50 and does not pass the second bridge portions 31i, thereby providing a magnetic circuit indicated by arrows in FIG. 6, since the first bridge portion 31h is greater in width than the second bridge portion 31i and therefore provides a greater path for the magnetic flux. Therefore, the second armature 50 is attracted into contact with the friction surface 31a' of the rotor base portion 31a against the bias of the leaf spring 51, so that the rotation of the rotor 31 is transmitted to the above-mentioned first load via the second armature 50, the leaf spring 51, the hub 49 and the output shaft 39. Upon de-energization of the coil 37, the second armature 50 is moved away from the friction surface 31a' of the rotor base portion 31a under the influence of the leaf spring 51 so that the transmission of the rotation of the rotor 31 to the first load is interrupted.

Figure 7:
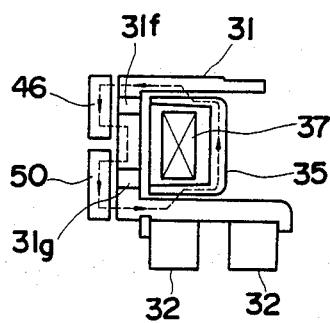

The width $W_1$ of each first bridge portion 31h is so determined that only a required amount of magnetic flux for attracting the second armature 50 passes each first bridge portion when the excitation current of a lower magnitude is applied to the coil 37, because any excessive magnetic flux only acts as a leakage magnetic flux. Thus, the width $W_1$ of the first bridge portion 31h is such that when the excitation current of a higher magnitude is applied to the coil 37, the excessive magnetic flux passes the first armature 46 to attract it into contact with the friction surface 31a' of the rotor base portion 31a against the bias of the leaf spring 45. Also, in this case, the second armature 50 is attracted into contact with the friction surface 31a' of the rotor base portion 31a, as is the case of applying the excitation current of a lower magnitude to the coil 37, because the circular area of the rotor base portion 31a in which the second arcuate slots 31g and the second bridge portions 31i of a smaller width $W_2$ has a relatively great magnetic resistance. Thus, a magnetic circuit indicated by arrows in FIG. 7 is provided when the excitation current of a higher magnitude is applied to the coil 37 so that the rotation of the rotor 31 is transmitted to the above-mentioned second load via the first armature 46, the mounting member 47, the leaf spring 45 and the hub 43 and also to the output shaft 39 connected to the first load. Upon de-energization of the coil 37, the first and second armatures 46 and 50 are moved away from the friction surface 31a' of the rotor base portion 31a under the influence of the respective leaf springs 45 and 51, so that the transmission of the rotation of the rotor 31 to the first and second loads is interrupted.

Figure 2:
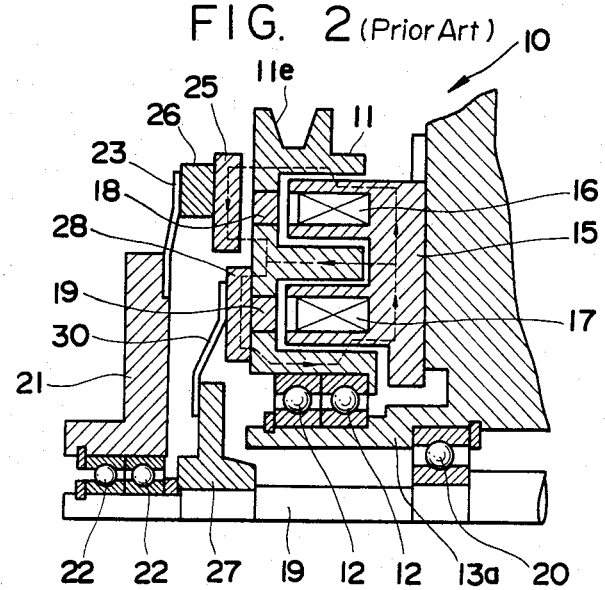

As described above, each first bridge portion 31h constitutes part of the magnetic circuit (FIG. 6) when the excitation current of a lower magnitude is applied to the coil 37, so as to attract the second armature 50. Therefore, the width $W_1$ of the first bridge portion 31h is so determined as to form a path of the magnetic flux required for attracting the second armature 50. On the other hand, each second bridge portion 31*i* does not constitute part of any magnetic circuit when the excitation current of either a lower or higher magnitude is applied to the coil 37. Therefore, the circumferentially disposed second arcuate slots 31*g* may be replaced by a single non-magnetic ring such as that designated at 19 in FIGS. 1 and 2.

In the illustrated embodiment, the attraction of the second armature 50 and the attraction of the first and second armatures 46 and 50 are selectively effected. It will be readily appreciated, however, that the relation between the widths $W_1$ and $W_2$ of the two bridge portions 31*h* and 31*i* may be reversed so that the attraction of the first armature 46 and the attraction of the first and second armatures 46 and 50 can be selectively effected.

Figure 8:
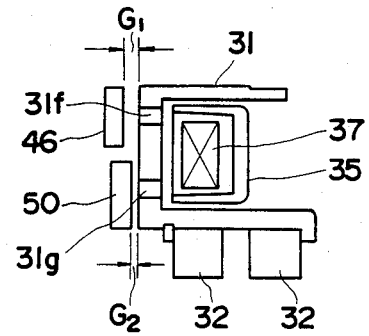

Also, in the illustrated embodiment, although an air gap $G_1$ between the first armature 46 and the rotor base portion 31*a* is equal to an air gap $G_2$ between the second armature 50 and the rotor base portion 31*a*, the air gap $G_1$ may be greater than the air gap $G_2$ as shown in FIG. 8 so that, even if the difference between the lower and greater magnitude currents is small, the first and second armatures 46 and 50 can be positively attracted into contact with the friction surface 31*a'* of the rotor base portion 31*a* in a selective manner as mentioned above. Also, the spring constant of the two leaf springs 45 and 51 supporting the first and second armatures 46 and 50, respectively, that is to say, their resistances to the electromagnetic attraction, may be different from each other by a predetermined amount, so that the selective attraction of the first and second armatures 46 and 50 can be further positively effected.

Figure 9:
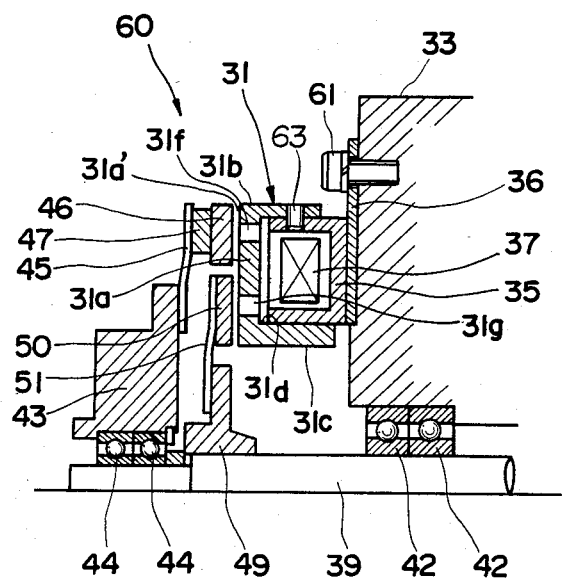
FIG. 9 is a cross-sectional view of an upper half of an electromagnetic brake provided in accordance with the present invention.

According to a modification of the invention shown in FIG. 9, there is provided an electromagnetic brake 60 which differs in construction from the electromagnetic clutch 30 in that an annular hollow member 35 of iron is fixedly secured to a frame 33. More specifically, the annular hollow member 35 has an integral flange 36 secured to the frame 33 by screws 61. An electrical coil 37 is received in the hollow iron member 35 to provide an electromagnet. An annular brake member 31 made, for example, of iron has an annular base portion 31*a* and a pair of concentric walls 31*b* and 31*c* extending from the base portion 31*a* to provide an annular hollow portion 31*d* of a U-shaped cross-section. The brake member 31 is fitted on the hollow iron member 35 and fixed thereto by screws 63 threaded through these two members.

The base portion 31*a* of the brake member 31 has a plurality of circumferentially-spaced first arcuate slots 31*f* and a plurality of circumferentially-spaced second arcuate slots 31*g* of a reduced length, as described above for the rotor 31 in FIG. 4.

A first armature 46 is mounted on a hub 43 through a mounting member 47 and a leaf spring 45, the hub 43 being rotatably mounted on a drive shaft 39 through bearing members 44. The hub 43 is connected to a first drive means (not shown). A second armature 50 is mounted on the drive shaft 39 through a leaf spring 51 and a hub 49, the drive shaft 39 being rotatably mounted on the frame 33 through bearing members 42 and connected to a second drive means (not shown).

With this construction, when an excitation current of a lower magnitude is applied to the coil 37, the second armature 50 is attracted into contact with the friction surface 31*a'* of the brake member 31 for the reasons described above for the electromagnetic clutch 30, so that the rotation of the hub 43 is stopped.

Also, when an excitation current of a higher magnitude is applied to the coil 37, the first and second armatures 46 and 50 are attracted into contact with the friction surface 31*a'* for the reasons described above for the electromagnetic clutch 30, so that the rotation of the hub 43 and the drive shaft 39 is stopped.

Since the electromagnetic clutch or the electromagnetic brake according to the present invention employs one coil, it is simple in construction, light in weight, compact in size and can be easily manufactured. Particularly, since only one coil is used, the diameter of electromagnet is reduced which contributes to a less bulky construction. In addition, there is no need for the provision of an excitation circuit for controlling the directions of the excitation current applied to the coil as is the case with the conventional electromagnetic device shown in FIG. 1, since the magnetic fluxes are produced in the same direction when the excitation current of either lower or higher magnitude is applied to the coil.

We claim:

1. An electromagnetic device comprising:
   (a) an electromagnet including an electrical coil;
   (b) means for selectively applying excitation current to said coil in a higher-magnitude mode and a lower-magnitude mode;
   (c) first and second spring-loaded armatures; and
   (d) an annular member made of a material of high permeability and having one surface disposed in closely spaced, opposed relation to said coil, said annular member having a pair of radially spaced first and second circumferential magnetic resistance portions, said first and second armatures being disposed in opposed relation to said first and second magnetic resistance portions, respectively, at least one of said first and second magnetic resistance portions being interrupted by circumferentially spaced magnetic bridge portions having such a size as to allow a predetermined amount of magnetic flux to pass therethrough to attract one of said first and second armatures, disposed in opposed relation to the other of said first and second magnetic resistance portions, into contact with the other surface of said annular member when the excitation current of lower magnitude is applied to said coil, said first and second armatures being spaced so closely from the other surface of said annular member that when the excitation current of higher magnitude is applied to said coil, the magnetic flux passes through said first and second armatures, thereby attracting them into contact with the other surface of said annular member.

2. An electromagnetic device according to claim 1, in which said annular member is mounted on a frame for rotation about an axis thereof, one of said first and second armatures being fixedly mounted on a shaft rotatably mounted on the frame while the other is rotatably mounted on the shaft.

3. An electromagnetic device according to claim 1, in which said annular member is fixedly secured to a frame, one of said first and second armatures being fixedly mounted on a shaft rotatably mounted on the frame while the other is rotatably mounted on the shaft.

4. An electromagnetic device according to claim 1, in which a gap between said first armature and the other surface of said annular member and a gap between said second armature and the other surface of said annular member are different from each other by a predetermined amount.

5. an electromagnetic device according to claim 1, in which said first and second armatures are supported by first and second spring elements, respectively, spring constants of said first and second spring elements being different from each other by a predetermined amount.

* * * * *